Nov. 6, 1934.  W. K. HOWE  1,980,136
SHOCK ABSORBING MEANS
Filed Nov. 21, 1931   2 Sheets-Sheet 2

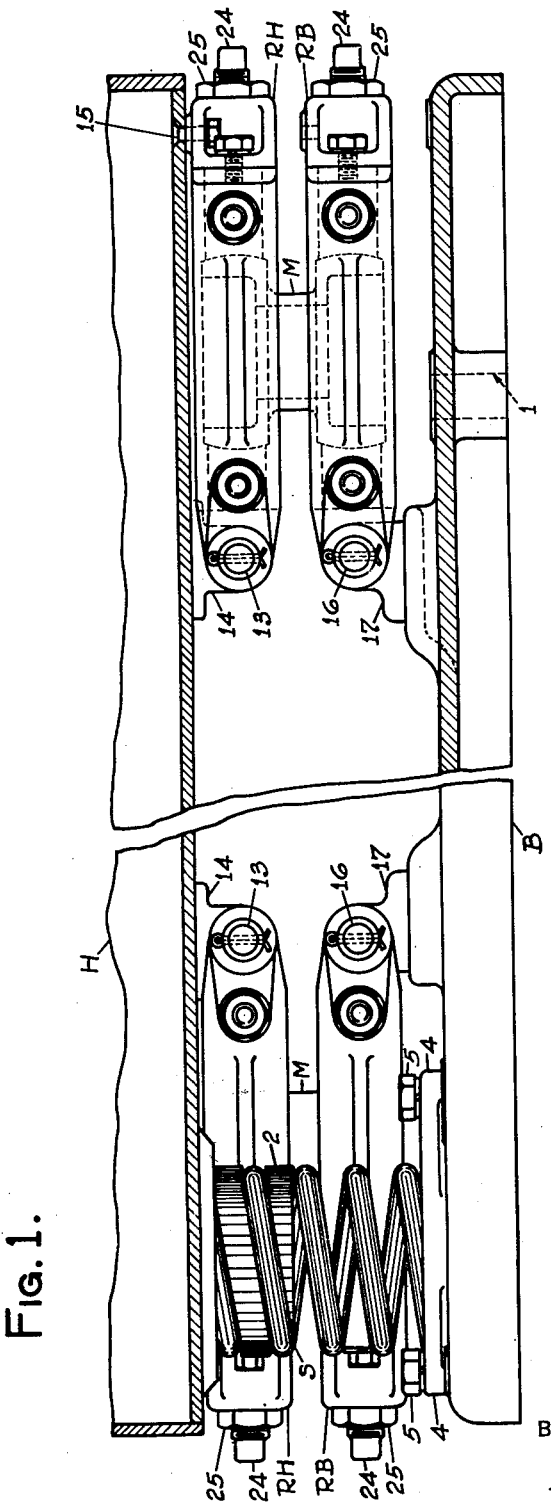

INVENTOR
W. K. Howe,
BY Neil D. Preston,
his ATTORNEY

Patented Nov. 6, 1934

1,980,136

UNITED STATES PATENT OFFICE 1,980,136

SHOCK ABSORBING MEANS

Winthrop K. Howe, Rochester, N. Y., assignor to General Railway Signal Company, Rochester, N. Y.

Application November 21, 1931, Serial No. 576,548

13 Claims. (Cl. 248—16)

This invention relates to shock absorbing means and more particularly to a means for supporting housings for sensitive electro-responsive devices on railway vehicles whereby such housing may be substantially insulated from or rendered immune to vibrations and shocks of the vehicle.

In railway train controlling systems, it is necessary to carry sensitive electro-responsive devices on railway vehicles and consequently such devices are subject to jars and vibrations which may be of an extent to cause undue wear and damage of the devices. To obviate these results it is customary to mount such devices in spring support housings and provide means for absorbing the motion imparted to the housing by such jars and vibrations.

In view of the above and other considerations, it is proposed in accordance with this invention to provide a simple and effective means for resilienty supporting such housings and for absorbng the energy transmitted into these resilient supports, whereby the vibration of the supported member in any plane may be subdued.

Other objects, purposes and characteristic features of the invention will appear as the description thereof progresses, during which references will be made to the accompanying drawings which show the invention in a manner to make it easily understood, rather than with the view of showing the particular construction preferably employed in practice, and in which:—

Fig. 1 is an elevational side view of the apparatus housing support in accordance with the present invention with parts removed and other parts in section to disclose the arrangement of the supporting means.

The present invention is applicable to any resiliently mounted device, but in this disclosure it will be considered as supporting a car-carried mechanism housing such as employed in the system disclosed in the prior patent to C. S. Bushnell, No. 1, 717,330, granted June 11, 1929.

A suitable housing H is employed of welded sheet metal construction suitably arranged to protect the sensitive electro-responsive devices against moisture, dirt, etc. and of ample size to permit convenient arrangement of such devices. A base B, on which the housing is to be resiliently mounted, is secured to the locomotive, or such vehicle as is to carry the housing H, by suitable means such as bolts passing through the holes 1 thereof.

Figure 2:
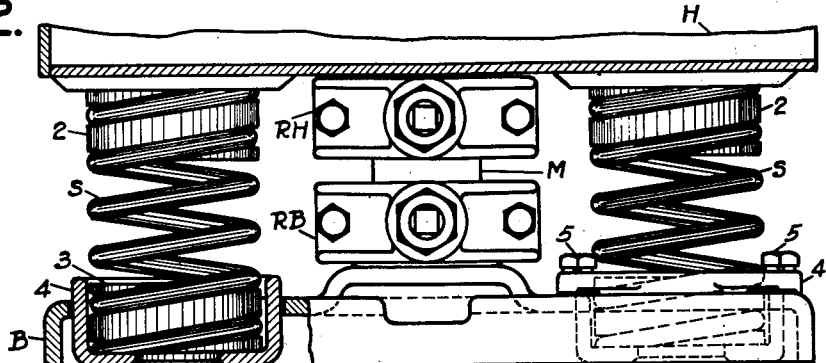
Fig. 2 is an elevational end view of Fig. 1.

Means for resiliently mounting this housing H on the base B is provided by a plurality of compression coil springs S which may be arranged at each corner of the housing as shown in Fig. 1 and Fig. 2. A simple means for retaining these springs S at their upper end is provided by a round retaining member 2 preferably welded to the housing H and having helical slots cut therein to receive the end of the spring S when turned thereon. A similar retaining member 3 is provided at the lower end of the spring S and is turned thereon in the same manner as member 2 before the housing isassembled on the base B. This member 3 has a cup shaped support 4 secured thereto such as by welding, and this support 4 is arranged to set into a hole in the base B and has a flared top resting on the top of the base B by which it may be secured such as the three screws 5.

It will now be noted that this housing H is thus resiliently supported to permit a vertical or horizontal motion with respect to the base B or any compound horizontal and vertical motion and yet retain the housing upon its base B.

Figure 3:
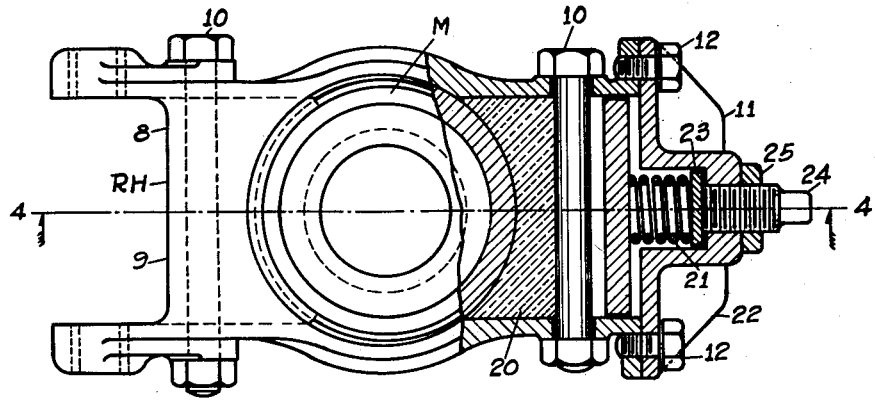
Fig. 3 is a top detail view of the vibration dampening device of the present invention with a part thereof shown in section.
Figure 4:
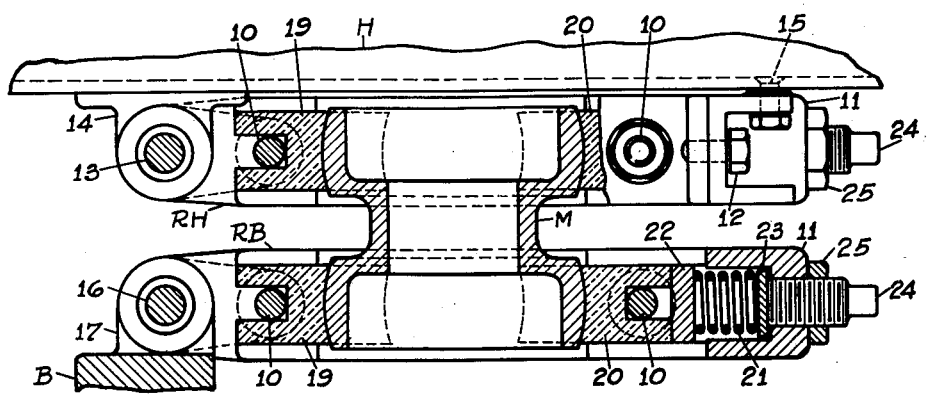
Fig. 4 is an elevational detail view of the device of Fig. 3 shown as a partial section on line 4—4 of Fig. 3 viewed in a direction indicated by the arrows.

To suitably dampen or subdue the above mentioned motion imparted to the housing H by any shocks or vibrations of the base B, this invention provides a means for producing frictional resistance to such movements of the housing H in any of the above mentioned directions. Referring now to Fig. 3 and Fig. 4, the dampening device consists essentially of a retaining member RH fixed to the housing H connected by a universally movable member M to a similar retaining member RB pivotally fixed to the base B.

The retaining members RH and RB are made up of two parts 8 and 9 clamped together by two bolts 10 and covered at one end by a cap 11 held by screws 12. The other end of these parts 8 and 9 have projecting lugs by which they may be pivoted or secured to their respective members. The retaining member RH is secured at one end to the housing H by a pin 13 passing through these lugs and a member 14 secured to the housing H and at the other end is clamped to the housing H by a bolt 15. The retaining member RB is pivoted at one end by a pin 16 passing through its extending lugs and through a member 17 secured to the base B, thereby permitting pivoting motion about this pin 16.

The parts 8 and 9 of the retaining members RH and RB are hollow and incase two frictional shoes 19 and 20 made of suitable material such as fiber. The member M is shaped at each end to form two joined partial spheres, one of these being held between the two shoes 19 and 20 of the retaining member RH and the other between the shoes of the retaining member RB. The shoes 19 and 20 are shaped to fit around the spherically shaped ends of the member M thereby forming a socket which retains the member M but permits universal rotation therein.

To produce suitable friction between the member M and its sockets, springs 21 are provided which bias the shoes 20 against the spherically shaped ends of the member M. One end of the spring 21 rests against a plate 22 which covers the ends of the shoes 20 and the other end of the springs 21 bears against a disk 23 placed in a recess in the cap 11. Adjusting screws 24 are threaded into the caps 11 and bear against the disks 23 by which the pressure of the shoes 20 may be varied and lock nuts 25 are provided to lock the screws 24 in their adjusted position.

Now it is evident that the rotatable member M is held so that movement thereof in either its socket in the member RH or its socket in the retaining member RB is frictionally retarded, and it is also evident that inasmuch as any possible movement of the retaining member RH relative to the retaining member RB must cause rotation of the member M in both of its sockets, such movement must also be frictionally retarded.

Thus any horizontal or vertical movement of the housing H relative to the base B is retarded by a corresponding movement of the member M in both of its frictional sockets. Consequently when a dampening device is employed in combination with the previously described spring supporting means, any shocks or vibrations of the base B may be absorbed by this spring and dissipated by the friction of the dampening device, thus substantially insulating the housing H from such shocks and vibrations of the base B. The vibration dampening device may be mounted as shown in Fig. 1 so that the adjusting screws 24 are easily reached to adjust the retarding friction of the devices in accordance with the weight of the housing H, and to take up for wear of the friction shoes 19 and 20.

A means for supporting a housing containing sensitive instruments has thus been provided which incorporates spring supports adapted to resiliently limit the vertical as well as the horizontal motion or any compound vertical and horizontal motion of the supported housing, and a simple means for securing these springs has been provided which permits easy assembly or removal thereof. The present invention has also provided a frictional snubbing means for subduing the motion imparted to this housing through this resilient supporting means and which is effective to such motion regardless of the plane in which it may occur.

In describing the present invention, attention has been directed to one specific embodiment thereof without attempting to point out the various alternate or optional features of construction or the different organizations or combinations that may be employed. For example, the snubbing means disclosed herein may be employed as a single unit or in any multiple series combination and need not necessarily be employed in combination with the particular spring supporting arrangement disclosed herein.

In other words, the particular embodiment of the present invention has been selected to facilitate in the disclosure thereof rather than to limit the number of forms which it may assume.

Having thus shown and described my invention, what I claim is:—

1. In a shock absorbing means for electro-responsive devices, a housing, a base, spring supporting means securing said housing to said base whereby motion of said housing relative to said base in any plane is resiliently limited and a universal vibration dampening means including members each having one spherically shaped end resting in a socket of friction material fixed to said housing and another spherically shaped end resting in a socket of friction material pivoted to said base.

2. In a shock absorbing means for electro-responsive devices, a housing, a base, coil springs secured beneath said housing, members having helical slots arranged to turn into the lower end of said springs, clamps for securing said members to said base, and friction producing means interconnecting said housing and said base and including a member having one enlarged spherically shaped end frictionally rotatable in a socket fixed to said housing and another enlarged spherically shaped end frictionally rotatable in a socket pivoted to said base.

3. A structure for supporting sensitive electro-responsive devices including a housing for said devices, a base for mounting said housing, spring supporting means securing said housing to said base whereby motion of said housing relative to said base in any plane is resiliently limited, a member having enlarged spherically shaped ends, a split socket fixed to said housing receiving one end of said member, a split socket pivotably secured to said base receiving the other end of said member and means biasing said split sockets against the enlarged ends of said member to frictionally retard rotation of said member therein.

4. A vibration dampening means for resiliently supported bodies including a fixed split socket secured to the resiliently supported body, a pivoting split socket attached to the body support, a member having one enlarged spherically shaped end rotatable in said fixed socket and another enlarged spherically shaped end rotatable in said pivoting socket, springs biasing said split sockets against the enlarged ends of said member and means for adjusting the pressure of said springs on said sockets.

5. A vibration dampening means for resiliently supported bodies including two members, one a body and one a support, damping means interconnecting the body and its support by ball and socket joints, one socket member being fixed to its member, and the other socket member being pivoted to its member, whereby every relative motion between said body and its support is frictionally retarded by movement of the balls in the stockets of the said joints.

6. In a shock absorbing means for electro-responsive devices, a housing, a base, coil springs secured beneath said housing, members having helical slots arranged to turn into the lower end of said springs, clamps for securing said members to said base, and friction producing means interconnecting said housing and said base and including a member carried by the housing, an enlarged spherical end on the member, and a socket of friction material pivoted to the base and movably receiving the said spherical end.

7. In a shock absorbing means for electro-responsive devices, two objects, one a housing, and the other a base, spring supporting means securing said housing to said base whereby motion of said housing relative to said base in any plane is resiliently limited and a universal vibration dampening means including members each having one spherically shaped end resting in a socket of friction material fixed to one of the objects and another spherically shaped end resting in a socket of friction material pivoted to the other object.

8. In a shock absorbing means for electro-responsive devices, two objects, one a housing, and the other a base, coil springs secured beneath one said object, members having helical slots arranged to turn into the lower end of said springs, clamps for securing said members to the other object, and friction producing means interconnecting said housing and said base and including a member having one enlarged spherically shaped end frictionally rotatable in a socket fixed to one said object and another enlarged spherically shaped end frictionally rotatable in a socket pivoted to the other said object.

9. A structure for supporting sensitive electro-responsive devices including two parts, one of which is a housing for said devices and the other of which is a base for mounting said housing, elastic supporting means securing said housing to said base whereby motion of said housing relative to said base in any plane is elastically limited, a member having enlarged spherically shaped ends, a split socket fixed to one of said parts receiving one end of said member, a split socket pivotably secured to the other said part receiving the other end of said member and means biasing said split sockets against the enlarged ends of said member to frictionally retard rotation of said member therein.

10. In a shock absorbing means for elastically mounted bodies, a housing, a base, and a universal vibration dampening means including members having one spherically shaped end resting in a socket of friction material fixed to said housing and another spherically shaped end resting in a socket of friction material pivoted to said base.

11. A damping means for elastically mounted bodies, comprising, a housing, including an extending arm pivoted to a support, a socket of friction material in the arm, a ball in the socket, and a ball and socket joint connecting the ball to the housing.

12. In a supporting member for elastically mounted bodies, a supported member, and a damping means for said members, including a socket fixed to one member, a socket pivoted to the other member, and a rigid member having spaced ball ends, with a ball end received one in each socket.

13. A shock absorber for resiliently mounted bodies, comprising a supporting member, a supported member, and a damping means for said members, including a socket of friction material fixed to one member, a socket of friction material carried by an extending arm pivoted to the other member, and a rigid member having spaced ball ends, with a ball end received one in each socket.

WINTHROP K. HOWE.